United States Patent [19]

Hunziker

[11] Patent Number: 4,882,415

[45] Date of Patent: Nov. 21, 1989

[54] POLYARYLENE DISULFIDE

[75] Inventor: Max Hunziker, Düdingen, Switzerland

[73] Assignee: Ciba-Geigy Corporation, Ardsley, N.Y.

[21] Appl. No.: 205,261

[22] Filed: Jun. 9, 1988

[30] Foreign Application Priority Data

Jun. 17, 1987 [CH] Switzerland ........................ 2276/87

[51] Int. Cl.[4] ........................ C08G 75/14; H01B 1/02; H01B 1/06

[52] U.S. Cl. .................................... 528/374; 252/500; 252/518; 528/220; 528/360

[58] Field of Search ........................ 528/374, 220, 360; 252/500, 518

[56] References Cited

U.S. PATENT DOCUMENTS

| | | | |
|---|---|---|---|
| 3,354,129 | 11/1967 | Edmond, Jr. et al. | 260/79 |
| 4,375,427 | 3/1983 | Miller et al. | 252/512 |
| 4,505,841 | 3/1985 | Denisevich, Jr. | 252/500 |

OTHER PUBLICATIONS

T. Sugano et al., Nippon Kagahu Kaishi, 3, 319, (1986).

V. A. Sergeyev et al., J. Polymer Science, Part A, 24, 3181, 1977.

P. Wolf et al., Chimia, 40, 200, (1986).

W. E. Truce et al., J. Am. Chem. Soc., 82, 2872, (1960).

W. E. Truce et al., J. Am. Chem. Soc., 84, 1621, (1962).

P. S. Odorisio, et al., Phosphorus and Sulfur, 13, 309, (1982).

V. A. Sergeyer, et al., J. Polymer Sci. Part A, Poly. Chem., 24, 3153, (1986).

*Primary Examiner*—Harold D. Anderson

*Attorney, Agent, or Firm*—Luther A. R. Hall

[57] ABSTRACT

Halogen-free polyarylene sulfides which are insoluble in organic solvents and infusible, essentially consisting of structural elements of the formula I (I)

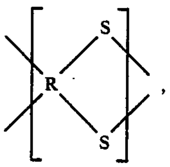

, these elements being present in the molecule more than five times and in which R is one of the following radicals

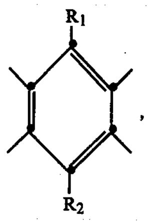

, 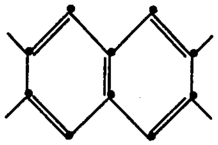 ,

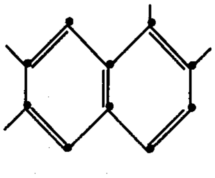

, 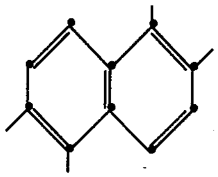 ,

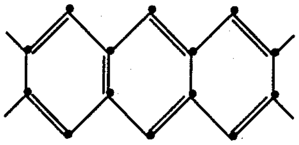

,

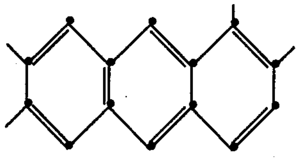

,

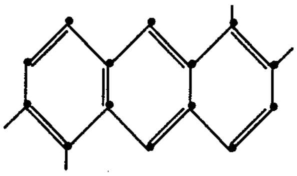

,

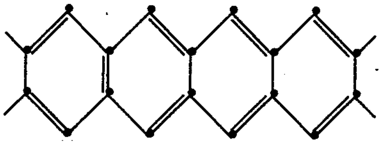

,

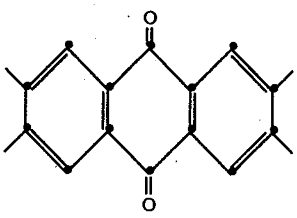 or 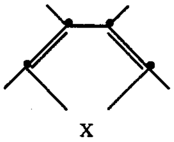 , in which $R_1$ and $R_2$ independently of one another are each —H, $C_1$–$C_{20}$-alkyl, aryl having not more than 12 C atoms, aralkyl having not more than 20 C atoms, alkaryl having not more than 20 C atoms, —CN, —$OCOR_3$, —OH or —$SR_4$, in which $R_3$ and $R_4$ independently of one another are each a $C_1$–$C_{20}$alkyl or aryl having not more than 12 C atoms, X is NH, $NR_5$, S or O, in which $R_5$ is a $C_1$–$C_{20}$alkyl or an aryl having not more than 12 C atoms, can be used after doping with oxidizing agents, for example iodine, bromine, $SbF_5$, $AsF_5$, $PF_5$ or $SbCl_5$, as electroconductive polymers.

7 Claims, No Drawings

POLYARYLENE DISULFIDE

The present invention relates to halogen free polyarylene sulfides which are insoluble in organic solvents and are infusible, a process for their preparation and their use as electroconductive polymers.

The processes known to date for the preparation of polyarylene sulfides give polymers which do not contain halogen or are not uniform, making them less suitable for the preparation of electroconductive polymers.

For example, in the process disclosed in U.S. Pat. No. 3,354,129, halo-substituted aromatic compounds are reacted with alkali metal sulfides in a polar organic solvent at elevated temperatures.

In Nippon Kagahu Kaishi, 3, 1986, pages 319 ff, it is stated that by heating 1,2,4,5-tetrachlorobenzene with anhydrous $Na_2CO_3$ and sulfur a polyarylene sulfide is obtained which is contaminated not only with chlorine but also with sulfur.

Journal of Polymer Science, Part A, Vol. 24, page 3153 ff, describes the synthesis of polyarylene sulfides by treating diphenyl sulfide, diphenyl disulfide, thianthrene, thiophenol or a benzene/sulfur mixture with $AlCl_3$ at high temperatures. In this case, mixtures of oligomeric arylene sulfides are obtained which soften upon heating and are partially soluble in benzene.

It has now been found that by thermal self-condensation of certain tetramercapto compounds in the temperature range between 200° and 400° C. very pure polyarylene sulfides are obtained which are insoluble in organic solvents and infusible upon heating and have, after doping with conventional oxidizing agents, for example bromine, metal or metalloid pentahalides, better properties as electroconductive polymers due to their purity.

The present invention therefore relates to halogen-free polyarylene sulfides which are insoluble in organic solvents and infusible, essentially consisting of structural elements of the formula I (I)

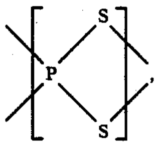

these elements being present in the molecule more than five times and in which R is one of the following radicals

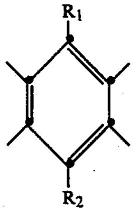
,
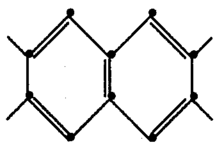
,

-continued

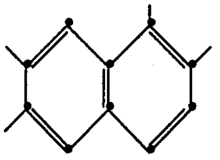
,
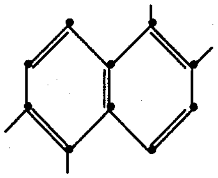
,

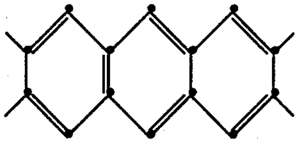
,

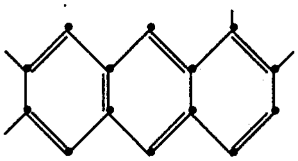
,

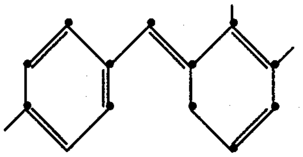
,

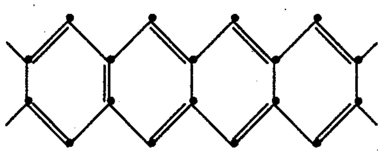
,

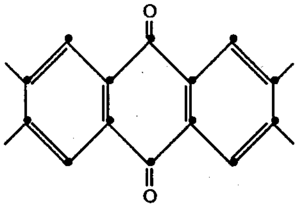
or
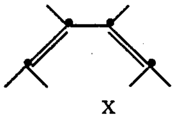
, in which $R_1$ and $R_2$ independently of one another are each —H, $C_1$–$C_{20}$-alkyl, aryl having not more than 12 C atoms, aralkyl having not more than 20 C atoms, alkaryl having not more than 20 C atoms, —CN, —$OCOR_3$, —OH or —$SR_4$, in which $R_3$ and $R_4$ independently of one another are each a $C_1$–$C_{20}$alkyl or aryl having not more than 12 C atoms, X is NH, $NR_5$, S or O, in which $R_5$ is a $C_1$–$C_{20}$alkyl or an aryl having not more than 12 C atoms.

Preferably, the polyarylene sulfides according to the invention contain the structural element of the formula I more than ten times.

The polyarylene sulfides according to the invention can be linear or partially branched polymers.

Preferably, R in the formula I is a radical of the formula

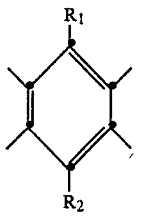

in which $R_1$ and $R_2$ independently of one another are a hydrogen atom, a $C_1$–$C_4$alkyl or a radical —$OCOR_3$ in which $R_3$ is a $C_1$–$C_{20}$alkyl, preferably a $C_1$–$C_4$alkyl.

In particular, the substituents $R_1$ and $R_2$ independently of one another are each a hydrogen atom, methyl or isopropyl. The abovementioned radicals R in the formula I having a fused ring system can be unsubstituted or likewise substituted by one more substituents $R_1$ or $R_2$, which except for a hydrogen atom have the abovementioned meaning. Alkyls $R_1$, $R_2$, $R_3$, $R_4$ and $R_5$ can be straight-chain or branched. Examples of suitable alkyls are methyl, ethyl, isopropyl, n-butyl, isopentyl, n-heptyl, 2-ethylhexyl, n-decyl or n-dodecyl. Aryls $R_1$, $R_2$, $R_3$, $R_4$ or $R_5$ can be, for example, phenyl, naphthyl or biphenyl.

Aralkyls $R_1$ and $R_2$ can be, for example, benzyl, phenylethyl or phenylpropyl. Alkaryls $R_1$ and $R_2$ can be, for example, tolyl, xylyl, ethylphenyl, propylphenyl, cumyl, tert.-butylphenyl, n-butylphenyl, n-hexylphenyl or n-dodecylphenyl.

The halogen-free polyarylene sulfides according to the invention of the formula I can be prepared by thermal self-condensation with elimination of $H_2S$ by heating tetramercapto compounds of the formula II

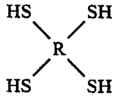

(II)

in which R is as defined in formula I, under inert gas or in a vacuum at temperatures between 200° and 400° C. in the absence of moisture or heating in an inert solvent under inert gas at temperatures between 200° and 400° C.

Preferably, the process according to the invention for the preparation of compounds of the formula I is carried out in such a manner that tetramercapto compounds of the formula II are heated at temperatures between 300° and 350° C. in a vacuum.

Some of the compounds of the formula II are known. For example, 1,2,4,5-tetramercaptobenzene is described in Phosphorus and Sulfur, 13, page 309 (1982) and 3,6-diisopropyl-1,2,4,5-tetramercaptobenzene is described in Chimia, 40, page 200 (1986). The remaining compounds of the formula II have not yet been described in the literature. Inasfar as the formula II includes novel compounds which were developed for the preparation of the compounds according to the invention of the formula I, the invention relates to these compounds as well. The compounds of the formula II can be prepared by dealkylating tetraalkylthio compounds of the formula III

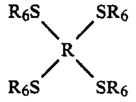

(III)

in which R is defined as in formula I and each $R_6$ is a $C_1$–$C_6$alkyl, preferably methyl or ethyl, by means of alkali metals in low-boiling primary amines to give compounds of the formula II. Such a process has been described, for example, in J. Amer. Chem. Soc. 82, 2872 (1960) or in J. Amer. Soc. 84, 1621 (1962).

The polyarylene sulfides according to the invention represent polymers which are insoluble in organic solvents. Likewise they are insoluble in concentrated acids such as sulfuric acid, nitric acid or dichloroacetic acid. In general, the polymers according to the invention have a light yellow colour and are hard, britte and infusible; their thermal decomposition begins above 400° C.

As mentioned above, the polyarylene sulfides according to the invention can be doped by treatment with oxidizing agents, for example bromine, metal or metalloid pentahalides to give electroconductive polymers. Upon doping, the polyarylene sulfides according to the invention adopt a dark colour. For example, they become dark blue or black upon doping with strong oxidizing agents such as $AsF_5$ or $SbF_5$. Accordingly, the invention further relates to polyarylene sulfides essentially consisting of structural elements of the formula I which are present in doped form by virtue of treatment with bromine, metal or metalloid pentahalides or other strong oxidizing agents and to their use as conducting polymers. The preferred doping agents for the polyarylene sulfides of the formula I are bromine, $SbF_5$, $SbCl_5$, $AsF_5$ or $PF_5$, in particular $AsF_5$, giving the preferably used electroconductive polymers.

For the purpose of doping the polyarylene sulfides of the formula I, the oxidizing agents are generally used in such amounts that at least 10 mol% of the repeating structural unit

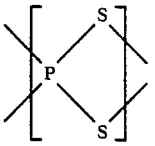

are present in the polymer in oxidized form or contain an anion derived from bromine, or a metal or metalloid pentahalide. Polyarylene sulfides consisting of structural elements of the formula I in which at least 20 mol%, in particular at least 30 mol%, of the repeating structural unit are present in oxidized form are the preferred doped polyarylene sulfides.

The polyarylene sulfides according to the invention can be used in doped form in electronics or microelectronics, for example as electroconductive fillers in antistatic finishing or in electromagnetic screening of electronic component parts, as electrode materials for batteries and for the preparation of sensors or semiconductor elements.

Preparation of the starting materials

1. Preparation of 1,2,4,5-tetramercaptobenzene

In a 3-1 sulfonating flask, 1,850 ml of dry n-propylamine and 9.6 g of granulated lithium are initially introduced under a nitrogen inert atmosphere. The mixture is stirred at room temperature until the blue colour persists, and 55.0 g of solid 1,2,4,5-tetraethylthiobenzene are then added. A slight exothermic reaction sets in, which is kept under control by cooling with an ice-bath to prevent the inside temperature of pg,7 the solution from exceeding 38° C. After the exothermic reaction has subsided, stirring is continued for 16–20 hours under a gentle stream of $N_2$, a further 400 mg of lithium are then added, and the mixture is heated at the reflux temperature for half an hour. The mixture is then cooled to 10° C. and 18.5 g of dry $NH_4Cl$ are added in portions. The mixture is heated to the boiling temperature of propylamine, about 1,500 ml of which are distilled off. The suspension, which has become viscous and greenish, is cooled to 5° C. and brought to a pH of 1 by the dropwise addition of 5N HCl. The temperature should not exceed 10° C. during this addition. The 1,2,4,5-tetramercaptobenzene which precipitates during the acidification is extracted from the reaction mixture with 1 times 1 liter and 2 times 500 ml of chloroform under an inert gas, the organic phase is dried with $Na_2SO_4$ and then evaporated to half its volume and cooled to −21° C. Tetramercaptobenzene precipitates as slightly greenish crystals. Yield: 20.5 g (57.5% of theory). Melting point (m.p.): 139°–142° C.

IR spectrum: SH band at 2,515 $cm^{-1}$, no more ethyl band.

$^1$H-NMR spectrum ($CDCl_3$): 7.43 ppm s(2H), 3.71 ppm s(4H).

For further purification, the product is sublimed at 140° C. in a high vacuum. The melting point increases to 146.5° to 147.5° C. Elemental analysis: calculated: C=34.92%, H=2.93%, S=62.15%; found: C=34.82%, H=3.00%, S=62.27%.

EXAMPLE 1

Preparation of polyarylene sulfide from 1,2,4,5-tetramercaptobenzene 1 g of 1,2,4,5-tetramercaptobenzene is melted into a glass ampoule, capacity about 20–30 ml, under a high vacuum. The ampoule is then completely immersed in a metallic bath of 300° C. and left there for 1 hour. The ampoule is removed from the metallic bath and allowed to cool and then opened under observation of suitable safety precautions. A positive pressure of about 10 bar due to the elimination of $H_2S$ has formed in the ampoule. The polymer, caked together to a hard yellow lump, can then be isolated. Yield: 645 mg, i.e. weight loss 35.5%. Calculated weight loss for polymerization degree ∞: 33.1%.

Elemental analysis: Calculated: C 52.15%, S 46.40%; Found: C 49.82%, S 47.36%.

IR spectrum: The SH band of the 1,2,4,5-tetramercaptobenzene at 2,515 $cm^{-1}$ has completely disappeared in the polymer.

DSC measurement: No glass transition visible; above 400° C. slow exothermic decomposition.

The product is insoluble in all conventional organic solvents, in particular even in boiling 1,2,4-trichlorobenzene, boiling biphenyl or terphenyl and boiling tribenzylamine at 380° C.

EXAMPLE 2

Example 1 is repeated except that the reaction is carried out at 300° C. over a period of 2 hours. The analytical data are listed in Table 1.

EXAMPLES 3–7

Example 1 is repeated except that, instead of the heat-sealed ampoule, a sealed tube with a safety valve against positive pressure which opens at about 5 bar is used and the temperature is controlled by means of a through-circulation oven instead of the metallic bath. The reaction conditions, weight losses obtained and analyses listed in Table 1.

EXAMPLES 8 and 9

1 g of 1,2,4,5-tetramercaptobenzene is dissolved in a 20-fold amount of a high-boiling inert solvent under an inert gas (argon) and heated for several hours at a temperature between 250° and 400° C. under a gentle argon stream. After cooling to room temperature, the solvent is extracted with toluene in a Soxhlet apparatus. This gives a light yellow powder as in Example 1. The Sh band is missing in the IR spectrum and the remaining absorptions are identical to those of the IR spectrum of the product from Example 1, but are sharper, which can be interpreted as an indication of a uniform product. The reaction conditions, weight losses obtained and analytical data are listed in Table 1.

TABLE 1

Preparation of polyarylene sulfides from 1,2,4,5-tetramercaptobenzene

| Example No. | Condensation temperature [°C.] | Time [h] | Weight loss [%] | Elemental analysis C found [%] | Elemental analysis S found [%] |
|---|---|---|---|---|---|
| 1 | 300 (b) | 1 | 35.7 | 49.82 | 47.36 |
| 2 | 300 (b) | 2 | 36.5 | 48.75 | 47.93 |
| 3 | 270 (a) | 6 | 29.6 | 48.00 | 47.53 |
| 4 | 350 (a) | 1 | 33.7 | 50.13 | 48.30 |
| 5 | 350 (a) | 1 | 31.6 | 50.07 | 46.32 |
| 6 | 350 (a) | 2 | 33.6 | 50.36 | 47.59 |
| 7 | 350 (a) | 2 | 30.6 | 50.01 | 46.58 |
| 8 | 300 (b) (c) | 6 | not determined | 49.42 | 46.80 |
| 9 | 300 (b) (c) | 6 | 34.2 | 52.05 | 46.05 |

(a) Air bath (through-circulation oven)
(b) Metallic bath
(c) Solvent terphenyl

EXAMPLE 10

Doping of various polymers from Examples 1–9

30–50 mg of an accurately weighed sample of the polymer in a weighing pan is placed in a stainless steel vacuum- and pressure-resistant vessel. The vessel is then evacuated several times and flushed again with dry high-purity argon to remove any traces of water from the apparatus. Finally, the apparatus is evacuated to at least $10^{-1}$ mbar and then a partial pressure of 650 mbar of $AsF_5$ is established in the vessel via a needle valve. The needle valve is then closed and a decrease of the $AsF_5$ partial pressure is observed which lasts for about 6–10 hours and is the result of the absorption of $AsF_5$ by the sample. The final value is 300 mbar. This is followed by flushing the apparatus again with dry high-purity argon and then removing excess $AsF_5$ at a dynamic vacuum of $5\times10^{-1}$ mbar over a period of 24 hours. The doped sample is then isolated from the vessel in an argon inert gas atmosphere and its electrical properties are measured. Table 2 contains the specific conductivities σ of various polymers according to Examples 1 to 9, which were treated with selected oxidizing agents. The specific conductivity σ was measured in a known manner at room temperature using pressed powders.

| Polymer according to Example No. | Oxidizing agent | Specific conductivity σ [S · cm$^{-1}$] | Equivalent of oxidizing agent per repeating structural unit |
|---|---|---|---|
| 1 | $Br_2$ | $4.4 \cdot 10^{-3}$ | 2.21 $Br^-$ |
| 1 | $AsF_5$ | $1.4 \cdot 10^{-2}$ | 1.02 $AsF_6^-$ |
| 2 | $Br_2$ | $2.7 \cdot 10^{-5}$ | 0.24 $Br^-$ |
| 2 | $AsF_5$ | $5.2 \cdot 10^{-2}$ | 0.90 $AsF_6^-$ |
| 3 | $Br_2$ | $5.1 \cdot 10^{-4}$ | 1.05 $Br^-$ |
| 3 | $AsF_5$ | $7.9 \cdot 10^{-3}$ | 0.67 $AsF_6^-$ |
| 4 | $Br_2$ | $1.3 \cdot 10^{-3}$ | 0.74 $Br^-$ |
| 4 | $AsF_5$ | $6.8 \cdot 10^{-2}$ | 0.87 $AsF_6^-$ |
| 5 | $AsF_5$ | $6.7 \cdot 10^{-2}$ | 0.88 $AsF_6^-$ |
| 6 | $AsF_5$ | $6.9 \cdot 10^{-2}$ | 0.86 $AsF_6^-$ |
| 6 | $Br_2$ | $2.2 \cdot 10^{-4}$ | 0.37 $Br^-$ |
| 9 | $AsF_5$ | $1.1 \cdot 10^{-1}$ | 0.52 $AsF_6$ |
| 1 | $SbF_5$ | $4.6 \cdot 10^{-5}$ | 0.034 $SbF_6^-$ |
| 1 | $I_2$ | $<10^{-9}$ | — |

EXAMPLE 11

Preparation of polyarylene sulfide from 2,3,5,6-tetramercapto-p-xylene (a) To prepare 2,3,5,6-tetramercapto-p-xylene, 600 ml of dry n-propylamine and 3.2 g of lithium powder are initially introduced into a 1-1 sulfonating flask under $N_2$ inert atmosphere. The mixture is warmed to 35° C. with thorough stirring, after which the mixture turns blue after about 1 hour. 20 g of 2,3,5,6-tetraethylthio-p-xylene are then added in small portions under a nitrogen counter-current, resulting in a slight exothermic reaction. The mixture is cooled to room temperature and stirring is continued for 20 hours under a gentle $N_2$ stream. The reaction solution is then refluxed for 1 hour, cooled again to 10° C. and treated with 5.9 g of ammonium chloride. Propylamine is then distilled off except for about 100 ml, the remaining solution is treated with 100 ml of degassed water and the pH is brought to 1 with 6N HCl. During the acidification a beige product precipitates. It is decanted and washed twice with about 100 ml of 1N HCl, and the product is taken up in ethanol/$CHCl_3$ (1:1), dried with $Na_2SO_4$ and evaporated to dryness on a rotary evaporator. The crude yield is 2.59 g (19% of theory), melting point 190°-210° C. The crude product is recrystallized twice from toluene under an inert gas (argon). M.p.=256°-258° C.

$^1$H-NMR spectrum ($CDCl_3$): 4.17 ppm s(4H), 2.60 ppm s(6H).

Elemental analysis: calculated: C=40.99%, H=4.30%, S=54.71%; found: C=40.94%, H=4.35%, S=54.94%. IR spectrum: SH band at 2,513 cm$^{-1}$.

($b_1$) A sealed tube, capacity about 10 ml, is filled with 320 mg of 2,3,5,6-tetramercapto-p-xylene and sealed with a spring-loaded pressure-releasing valve. The sealed tube is then heated in a muffle furnace for 2 hours at 250° C. After cooling, the polymer is obtained as a hard yellowish lump.

Yield: 228 mg, i.e. weight loss 28.8%. Calculated weight loss for polymerization degree ∞: 29.1%.

IR spectrum: SH band completely gone.

Elemental analysis: calculated: C=57.80%, H=3.64%, S=38.57%; found: C=56.50%, H=3.72%, S=38.08%.

The polymer is insoluble and infusible.

($b_2$) A sealed tube, capacity 20-30 ml, is filled with 1 g of 2,3,5,6-tetramercapto-p-xylene together with 10 g of terphenyl and sealed with a pressure-relief valve. The mixture is melted at 260° C. and the components are mixed until a homogeneous solution has formed. The mixture is then heated for 6 hours at 300° C., cooled and the terphenyl is subsequently extracted with toluene from the reaction mixture in a Soxhlet apparatus. This gives 691 mg of a beige powder. The SH band is still barely visible in the IR spectrum of the product.

Elemental analysis: calculated for polymerization degree n=11: C=55.72%, H=3.72%, S=40.56%; found: C=54.97%, H=3.77%, S=40.45%.

Longer reaction times or higher reaction temperatures give higher polymerization degrees.

(c) Doping of the polymers from ($b_1$) and ($b_2$) by the method described in Example 10.

| Polymer | Oxidizing agent | Specific conductivity σ (S · cm$^{-1}$) | Equivalent of oxidizing agent per repeating structural unit |
|---|---|---|---|
| $b_1$ | $AsF_5$ | $1.7 \cdot 10^{-3}$ | ~0.61 $AsF_6^{\ominus}$ |
| | $PF_5$ | $2.2 \cdot 10^{-8}$ | |
| $b_2$ | $AsF_5$ | $3 \cdot 10^{-4}$ | ~0.17 $AsF_6^{\ominus}$ |

What is claimed is:

1. A chlorine-free polyarylene sulfide which is insoluble in organic solvents and infusible, essentially consisting of structural elements of the formula I

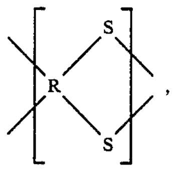 (I)

these elements being present in the molecule more than five times and in which R is one of the following radicals

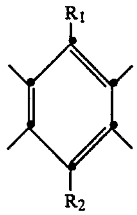 , 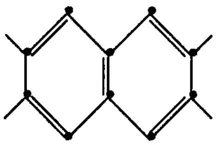 ,

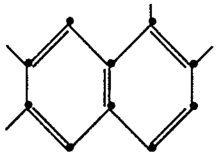 , 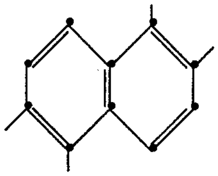 ,

-continued

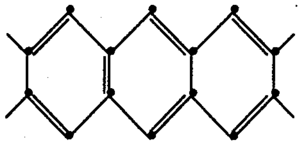,

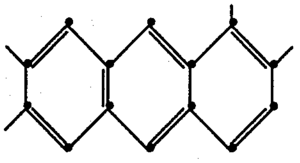,

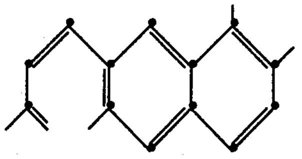,

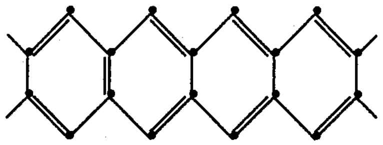,

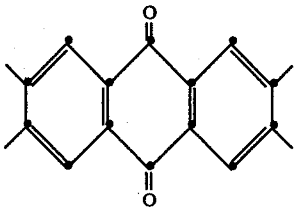 or 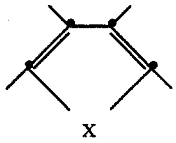, in which $R_1$ and $R_2$ independently of one another are each —H, $C_1$-$C_{20}$-alkyl, aryl having not more than 12 C atoms, aralkyl having not more than 20 C atoms, alkaryl having not more than 20 C atoms, —CN, —$OCOR_3$, —OH or —$SR_4$, in which $R_3$ and $R_4$ independently of one another are each a $C_1$–$C_{20}$alkyl or aryl having not more than 12 C atoms, X is NH, $NR_5$, S or O, in which $R_5$ is a $C_1$–$C_{20}$alkyl or an aryl having not more than 12 C atoms.

2. A polyarylene sulfide according to claim 1, in which R in formula I is a radical of the formula

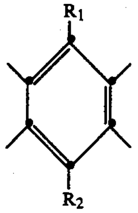

in which $R_1$ and $R_2$ independently of one another are a hydrogen atom, a $C_1$–$C_4$alkyl or a radical —$OCOR_3$ in which $R_3$ is a $C_1$–$C_{20}$alkyl.

3. A polyarylene sulfide according to claim 1, in which R in formula I is a radical of the formula

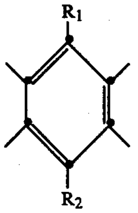

in which $R_1$ and $R_2$ independently of one another are each a hydrogen atom, methyl or isopropyl.

4. A process for the preparation of a polyarylene sulfide of the formula I according to claim 1, which comprises heating a tetramercapto compound of the formula II

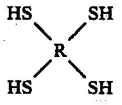 (II)

in which R is as defined in formula I, under inert gas or in a vacuum at temperatures between 200° and 400° C. in the absence of moisture or heating in an inert solvent under inert gas at temperatures between 200° and 400° C.

5. A process according to claim 4, wherein a tetramercapto compound of the formula II are heated in a vacuum at temperatures between 300° and 350° C.

6. A dopant composition comprising a polyarylene sulfide according to claim 1 and an oxidizing agent which is bromine, a metal pentahalide or a metalloid pentahalide.

7. A dopant composition according to claim 6 wherein the oxidizing agent is bromine, $SbF_5$, $SbCl_5$, $AsF_5$ or $PF_5$.

* * * * *